Patented Nov. 21, 1933

1,936,277

UNITED STATES PATENT OFFICE 1,936,277

METALLIFEROUS DISAZO-DYESTUFFS AND PROCESS OF MAKING SAME

Fritz Straub and Walter Hanhart, Riehen, near Basel, Switzerland, assignors to the firm of Society of Chemical Industry in Basle, Basel, Switzerland No Drawing. Application February 13, 1933, Serial No. 656,620, and in Switzerland February 18, 1932

19 Claims. (Cl. 260—12)

The present invention relates to new disazo-dyestuffs. It comprises the process of making these dyestuffs, the dyestuffs themselves and the material dyed with the new dyestuffs.

According to the present invention new valuable metalliferous disazo-dyestuffs may be obtained as follows:—Treating the 4:4'-dinitrostilbene-3:3'-dicarboxylic acid in a first step with reducing agents, such as for example iron or zinc, or with alkali sulfides, such as for example sodium sulfide, tetrazotizing the 4:4'-diaminostilbene-3:3'-dicarboxylic acid thus obtained in a second step with nitrous acid, coupling the tetrazotized 4:4'-diaminostilbene-3:3'-dicarboxylic acid in a third step with coupling components, and finally treating the disazo-dyestuffs of the general formula

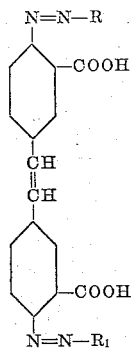

wherein R and R₁ represent the radicles of coupling components, in a fourth step with an agent yielding metal capable of forming lakes with the lake forming groups of the disazo-dyestuffs.

Coupling components which may be coupled with the tetrazotized 4:4'-diaminostilbene-3:3'-dicarboxylic acid are all those which come into consideration for the production of azo-dyestuffs, such as for example arylamines, phenols, naphthols, as well as their substitution products which may contain for example halogen, sulfonic acid groups, alkyl-, nitro- or alkoxy-groups, as also compounds of which the carbon atom capable of coupling belongs to a heterocyclic ring or to an open chain. The former is for example the case with pyrazolones, hydroxyquinolines and barbituric acids, as well as with their substitution products which may contain for example halogen, sulfonic groups, alkyl-, nitro-, or alkoxy-groups; the latter for instance with the aceto-acetic acid derivatives and the benzoylaceto-o-carboxylic acids.

As agents yielding metal capable of forming lakes with the lake-forming-groups of the disazo-dyestuff there come into consideration for example compounds of chromium, copper, iron, cobalt, nickel, manganese, zinc, vanadium, and titanium. Of these particularly valuable results are obtained with those which contain metals of the atomic weight 52 to 66, and the most valuable dyestuffs are obtained with agents yielding copper.

The disazo-dyestuffs may be treated with the agents that yield metal either in substance or on the fiber or in the dye-bath; the treatment can also occur simultaneously with the production of the azo-dyestuff.

The metalliferous dyestuffs thus obtained may contain one or more metals; in making those that have more than one metal, the agents that yield the metals may be used simultaneously or in succession in forming the metalliferous dyestuff.

The treatment with the agent that yields metal may be in acid, neutral or alkaline medium, with or without a suitable addition and at normal or raised pressure.

The complex metal compounds made in accordance with the invention may be used for dyeing materials of any kind, such as cotton, wool, loaded or non-loaded silk, leather, artificial silk from regenerated cellulose, cellulose esters or ethers, or varnishes made from a cellulose basis and a natural or artificial resin basis; or as pigments or in printing. The dyeings are of various tints and are very fast.

The following examples illustrate the invention, the parts being by weight:—

*Example 1*

17.9 parts of 4:4'-dinitrostilbene-3:3'-dicarboxylic acid are dissolved in 100 parts of hot water with the addition of 13 parts of caustic soda solution of 30 per cent. strength and, after addition of a solution of 48 parts of crystallized sodium sulfide in 120 parts of water, the whole is heated to boiling for some minutes and then stirred for about an hour at 80° C. The mass is then acidified, while hot, with dilute hydrochloric acid, then allowed to cool, neutralized by means of sodium acetate until it imparts a very feeble blue to Congo paper, and then filtered. For the separation of sulfur the product is reprecipitated from its solution in sodium carbonate or dilute caustic soda solution. The 4:4'-diaminostilbene-3:3'-dicarboxylic acid of the formula

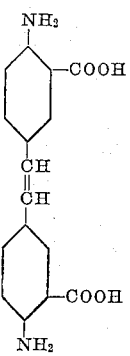
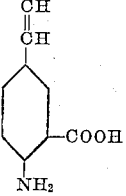
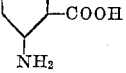

thus obtained is a yellow to reddish-brown powder.

The 4:4'-dinitrostilbene-3:3'-dicarboxylic acid, which is the parent material in this example, may be made from 6-nitro-3-methyl-1-benzoic acid by oxidation with sodium hypochlorite in an alkaline solution. It is a greenish-yellow powder, very sparingly soluble in water; after recrystallization from boiling nitrobenzene it melts above 280° C.

Example 2

29.8 parts of 4:4'-diaminostilbene-3:3'-dicarboxylic acid are suspended in 300 parts of water and dissolved by addition of the proportion of caustic soda solution necessary for forming the di-sodium salt. To the neutral or feebly alkaline solution there are added 14 parts of sodium nitrite in the form of an aqueous solution of 20 per cent. strength and the whole is stirred well, while there is gradually run in a mixture of 70 parts of concentrated hydrochloric acid and ice. After stirring for some time the tetrazo solution assumes a light brown color. It is then run into a cooled solution, alkaline with sodium carbonate, of 48 parts of 1-amino-8-hydroxynaphthalene-4-sulfonic acid. When coupling is complete the dyestuff of the formula

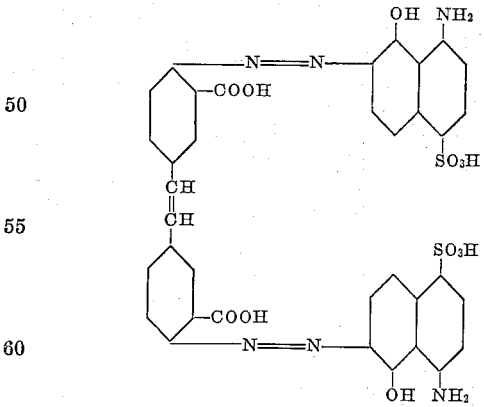

is filtered after addition of some common salt; if desired it may be re-precipitated and dried. It is a dark powder, soluble in concentrated sulfuric acid to a blue solution and in water to a violet solution. It dyes cotton in neutral or feebly alkaline baths grey-blue tints which become fast green-blue when treated with copper salts.

Example 3

Into the solution of the tetrazotized 4:4'-diamino-stilbene-3:3'-dicarboxylic acid, made as described in Example 2, there is poured while stirring well a cooled solution, alkaline with sodium carbonate, of 22.4 parts of 1-hydroxynaphthalene-4-sulfonic acid. When coupling is complete there is added a solution, alkaline with sodium carbonate, of 31.5 parts of 2-(phenyl)-amino-5-hydroxynaphthalene-7-sulfonic acid. Towards the end of the coupling the mass is gently warmed. The dyestuff of the formula

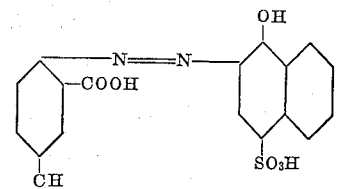
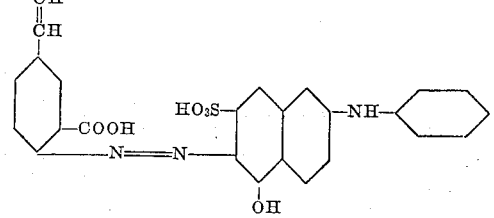

is now filtered, after addition of common salt, and if desired recrystallized and dried. It is a dark powder of bronze lustre, which dissolves in concentrated sulfuric acid to a blue solution and in water to a red-violet solution; it dyes unmordanted cotton reddish-violet, which by subsequent treatment with copper salts passes into a fast pure violet.

Example 4

Into the solution of the tetrazotized 4:4'-diaminostilbene-3:3'-dicarboxylic acid obtained as described in Example 2 is poured, while stirring well, a cooled solution, alkaline with sodium carbonate, of 24 parts of 1-amino-8-hydroxynaphthalene-4-sulfonic acid. The formation of the intermediate dyestuff comes rapidly to an end. There is then added an alkaline solution of 19.2 parts of acetic acid anilide and the whole is heated somewhat towards the end of the coupling. After salting out, filtering and drying, the dyestuff of the formula

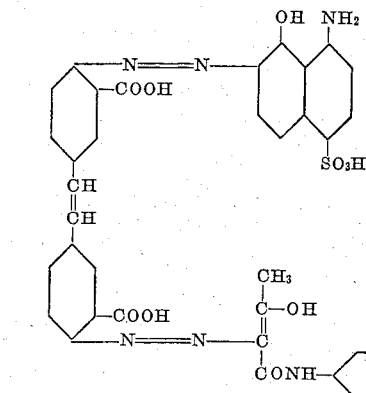

is a dark powder which dissolves in concentrated sulfuric acid to a muddy violet solution and in water to a claret-red solution, and dyes cotton brownish-grey tints which become a very fast olive by subsequent treatment with copper salts.

Example 5

Into the solution of the tetrazotized 4:4'-diaminostilbene-3:3'-dicarboxylic acid, obtained as described in Example 2, there is run a cooled solution, alkaline with sodium carbonate, of 63 parts of 2-(phenyl)-amino-5-hydroxynaphthalene-7-sulfonic acid. Stirring is continued, while cooling with ice, and subsequently at room temperature, until a test sample in concentrated sulfuric acid shows no further change of color. The mass is then feebly heated for some time. The salted-out dyestuff of the formula

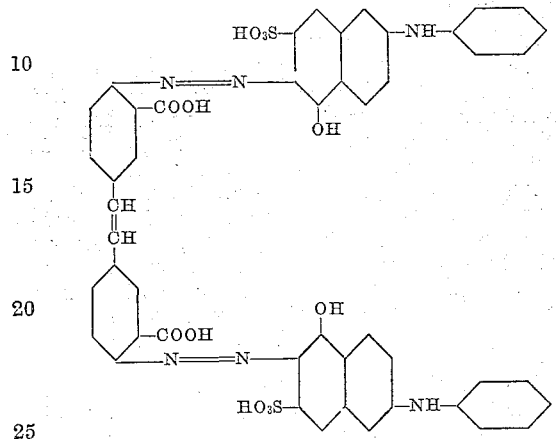

is re-precipitated and dried. It is a dark powder of bronze lustre which dissolves in concentrated sulfuric acid to a blue solution, in water to a red-violet solution and produces on unmordanted cotton a violet tint, which, when subsequently treated with copper salt, passes into a fast, pure blue-violet.

*Example 6*

10 parts of the dyestuff obtainable as described in Example 5 are dissolved in 3000 parts of hot water and, after addition of some ammonia, the solution is heated for ½ hour at 80–90° C. with a solution of ammoniacal copper oxide corresponding with 5 parts of crystallized copper sulfate. After neutralizing with acetic acid the dyestuff is salted out completely and filtered. When dry it is a dark powder of bronze lustre, soluble in water to a violet solution and dyeing cotton in a bath containing Glauber's salt pure blue-violet tints.

*Example 7*

To the solution of the tetrazotized 4:4'-diaminostilbene-3:3'-dicarboxylic acid made as described in Example 2, there is added, while stirring well, a solution, made alkaline with sodium bicarbonate, of 28.8 parts of 1-(2'-chloro-5'-sulfophenyl)-3-methyl-5-pyrazolone and, when the formation of the intermediate dyestuff is complete, an alkaline solution of 17.4 parts of 1-phenyl-3-methyl-5-pyrazolone is added. When coupling is complete, the dyestuff of the formula

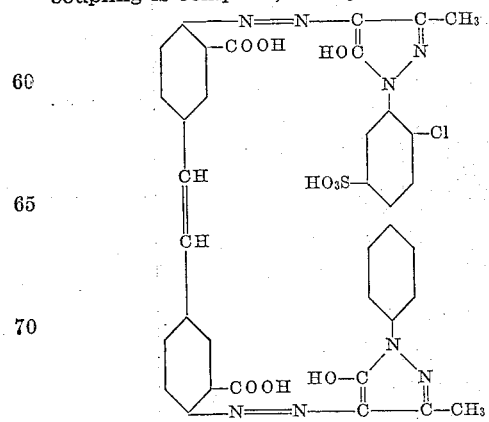

is salted out, filtered and dried. It is a brown-red powder, soluble in concentrated sulfuric acid to a violet solution and in water to a yellow-brown solution; it dyes cotton a covered red which yields a fast-red-orange by after-treatment with a copper salt.

*Example 8*

8 parts of the disazo-dyestuff made as described in Example 7 are dissolved in 2400 parts of hot water and, after addition of a solution of 6 parts of crystallized copper sulfate in 50 parts of water, the mixture is heated for 2 hours at 70–80° C. The dyestuff is then completely precipitated by addition of common salt, filtered and dried. The cupriferous dyestuff is a reddish-brown powder which dissolves in water to an orange-brownish solution. By concentrated sulfuric acid the metal compound is immediately split up. On cotton, in a bath containing Glauber's salt, the dyestuff produces a fast reddish-orange which corresponds completely in shade with that produced on the fiber by after-treatment of the dyestuff made according to Example 7.

*Example 9*

A solution of the tetrazotized 4:4'diaminostilbene-3:3'-dicarboxylic acid is made as described in Example 2. It is then coupled in an acetic acid solution with a suspension of 22 parts of 2-phenylaminonaphthalene and after the coupling is complete the intermediate product is filtered off and combined in an alkaline solution with 24 parts of 1-amino-8-hydroxynaphthalene-4-sulfonic acid. When coupling is complete the dyestuff of the formula

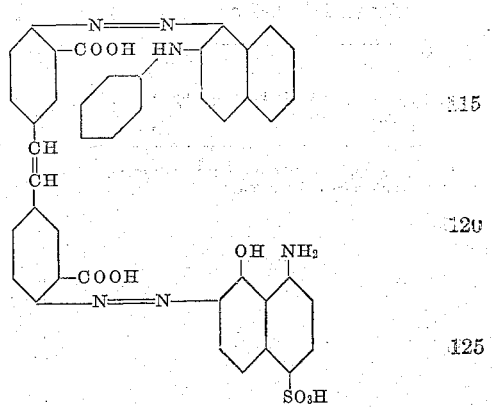

is filtered after addition of some common salt.

After drying a dark powder is obtained dissolving in water to a blue-violet solution, and in concentrated sulfuric acid to a muddy violet solution. It dyes cotton in a bath containing Glauber's salt blue-violet tints which become blue by subsequent treatment with copper salts.

8.5 parts of this dyestuff are dissolved in 1500 parts of hot water and after addition of 2.5 parts of ammonia combined with vanadic acid boiled for 2 hours in a reflux apparatus. The dyestuff is then precipitated and filtered by addition of common salt. After drying it is a dark powder, dissolving in concentrated sulfuric acid to a blue solution, and in water to a violet solution, and dyeing cotton in a bath containing Glauber's salt violet tints.

*Example 10*

A solution of the tetrazotized 4:4'-diaminostilbene-3:3'-dicarboxylic acid is made as described in Example 2. To the tetrazo solution there is added, while stirring well, a solution of 69 parts of 2-(2'methoxy)-phenylamino-5-hydroxynaphthalene-7-sulfonic acid. Stirring is continued, at the beginning while cooling with ice, and subsequently at room temperature, until the coupling is complete. The dyestuff of the formula

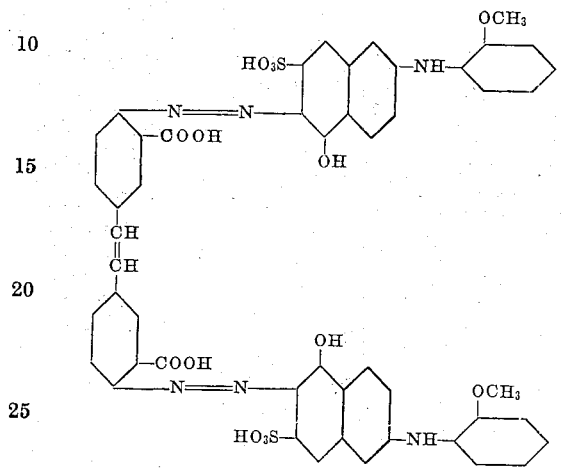

is filtered off after addition of some common salt, if necessary re-precipitated and dried.

It represents a dark powder of bronze lustre dissolving in concentrated sulfuric acid to a blue solution, in water to a violet solution, and dyeing cotton violet tints which become blue-violet by subsequent treatment with copper salts.

11 parts of this dyestuff are dissolved or suspended in 2000 parts of hot water and after addition of an ammoniacal solution of 7.2 parts of nickel-sulfate heated for 2 hours to 80–90° C. The dyestuff is then precipitated and filtered by addition of common salt. After drying it is a dark powder of bronze lustre, dissolving in concentrated sulfuric acid to a blue solution, and dyeing cotton in a bath containing Glauber's salt violet tints.

*Example 11*

7.5 parts of the dyestuff obtained according to Example 7 are dissolved in 750 parts of hot water and after addition of a chromium fluoride solution corresponding to 1.52 parts of $Cr_2O_3$ boiled for a long time in a reflux apparatus. The dyestuff is then precipitated and filtered by addition of common salt. After drying it is a red-brown powder dissolving in concentrated sulfuric acid to a red-violet solution and in water to a red-brown solution, and dyeing cotton in a bath containing Glauber's salt reddish tints.

*Example 12*

A dye-bath is prepared with 2 parts of the dyestuff of Example 7, 50 parts of Glauber's salt or 30 parts of common salt. 100 parts of cotton are introduced into the bath at 60–70° C. the temperature is raised to the boil within ¼ hour, and dyeing is continued for ½ to ¾ hour. The goods are then rinsed and after-treated for ½ hour in a fresh bath at 60–70° C. after addition of 2 parts of chromium formate. Subsequently the goods are rinsed and dried. Cotton is dyed reddish tints.

In the following table are given the properties of some of the cupriferous dyestuffs obtainable according to this invention:—

| Coupling component | Formula of the disazo-dyestuff | Dyeing on cotton with the cupriferous dyestuff |
|---|---|---|
| (1) 2 mol. 2-(phenyl)-amino-8-hydroxynaphthalene-6-sulfonic acid | | Reddish-grey. |
| (2) 1 mol. 1-amino-8-hydroxynaphthalene-4-sulfonic acid and 1 mol. barbituric acid | | Green-grey. |

| Coupling component | Formula of the disazo-dyestuff | Dyeing on cotton with the cupriferous dyestuff |
|---|---|---|
| (3) 1 mol. 2-(phenyl)-aminonaphthalene-5:7-disulfonic acid and 1 mol. 2-(phenyl)-amino-5-hydroxynaphthalene-7-sulfonic acid | | Blue. |
| (4) 2 mol. 1-amino-8-hydroxynaphthalene-3:6-disulfonic acid | | Greenish-blue. |
| (5) 1 mol. 2-(phenyl)-amino-5-hydroxynaphthalene-7-sulfonic acid and 1 mol. 2-hydroxynaphthalene | | Violet. |
| (6) 2 mol. 1-hydroxynaphthalene-5-sulfonic acid | | Reddish blue. |

| Coupling component | Formula of the disazo-dyestuff | Dyeing on cotton with the cupriferous dyestuff |
|---|---|---|
| (7) 1 mol. 1-amino-8-hydroxynaphthalene-4-sulfonic acid and 1 mol. 2-hydroxynaphthalene | | Grey. |
| (8) 2 mol. 2-amino-5-hydroxynaphthalene-7-sulfonic acid. | | Violet. |
| (9) 2 mol. 2-amino-8-hydroxynaphthalene-6-sulfonic acid. | | Grey. |
| (10) 1 mol. 2-(phenyl)-aminonaphthalene and 1 mol. 1-amino-8-hydroxynaphthalene-4-sulfonic acid. | | Blue. |

| Coupling component | Formula of the disazo-dyestuff | Dyeing on cotton with the cupriferous dyestuff |
|---|---|---|
| (11) 1 mol. 2-(phenyl)-aminonaphthalene and 1 mol. 1-hydroxynaphthalene-5-sulfonic acid. | | Violet. |
| (12) 1 mol. 2-(phenyl)-amino-8-hydroxynaphthalene-6-sulfonic acid and 1 mol. 2-(phenyl)-amino-5-hydroxynaphthalene-7-sulfonic acid. | | Blue violet. |
| (13) 2 mol. 7'-sulfo-5'-hydroxy-2'-naphthyl-4-aminophenoxy-acetic acid. | | Blue. |
| (14) 1 mol. 2-(phenyl)-amino-5-hydroxynaphthalene-7-sulfonic acid and 1 mol. 1-amino-8-hydroxynaphthalene-4-sulfonic acid. | | Reddish blue. |

| Coupling component | Formula of the disazo-dyestuff | Dyeing on cotton with the cupriferous dyestuff |
|---|---|---|
| (15) 1 mol. 2-(phenyl)-amino-naphthalene-5:7-disulfonic acid and 1 mol. 2-hydroxynaphthalene. | [structure] | Reddish violet. |
| (16) 2 mol. 2-(2'-carboxy)-phenylamino-5-hydroxynaphthalene-7-sulfonic acid. | [structure] | Blue. |
| (17) 2 mol. 2-(2'-methoxy)-phenylamino-5-hydroxynaphthalene-7-sulfonic acid. | [structure] | Blue violet. |

What we claim is:—

1. As a step in the manufacture of metalliferous disazo-dyestuffs, tetrazotizing the 4:4'-diaminostilbene-3:3'-dicarboxylic acid with nitrous acid.

2. As a step in the manufacture of metalliferous disazo-dyestuffs, coupling the tetrazotized 4:4'-diaminostilbene-3:3'-dicarboxylic acid with coupling components.

3. As a step in the manufacture of metalliferous disazo-dyestuffs, coupling the tetrazotized 4:4'-diaminostilbene-3:3'-dicarboxylic acid with coupling components of the naphthalene series.

4. As a step in the manufacture of metalliferous disazo-dyestuffs, coupling the tetrazotized 4:4'-diaminostilbene-3:3'-dicarboxylic acid with 2-(phenyl)-amino-5-hydroxynaphthalene-7-sulfonic acid.

5. As a step in the manufacture of metalliferous disazo-dyestuffs, treating the disazo-dyestuffs of the general formula

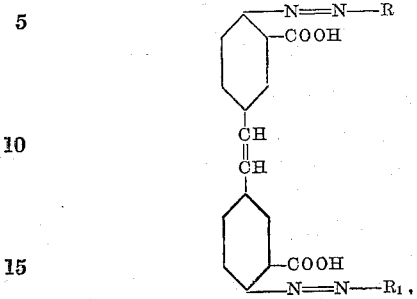

wherein R and R₁ represent the radicles of coupling components, with an agent yielding metal capable of forming lakes with the lake-forming groups of the disazo-dyestuffs.

6. As a step in the manufacture of cupriferous disazo-dyestuffs, treating the disazo-dyestuffs of the general formula

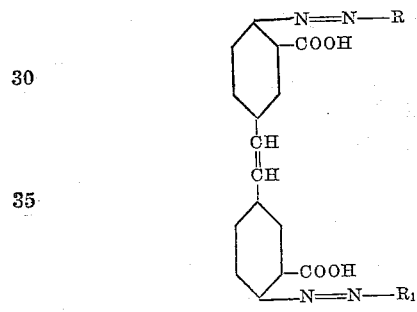

wherein R and R₁ represent the radicles of coupling components, with agents yielding copper.

7. Process for the manufacture of metalliferous disazo-dyestuffs, consisting in treating the 4:4'-dinitrostilbene-3:3'-dicarboxylic acid in a first step with reducing agents, tetrazotizing the 4:4'-diaminostilbene-3:3'-dicarboxylic acid in a second step with nitrous acid, coupling the tetrazotized 4:4'-diaminostilbene-3:3'-dicarboxylic acid in a third step with coupling components and treating the obtained disazo-dyestuffs of the general formula

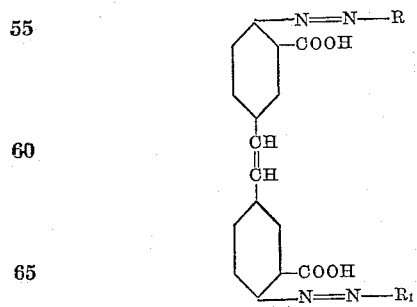

wherein R and R₁ represent the radicles of coupling components, in a fourth step with an agent yielding metal capable of forming lakes with the lake-forming groups of the disazo-dyestuffs.

8. Process for the manufacture of cupriferous disazo-dyestuffs, consisting in treating the 4:4'-dinitrostilbene-3:3'-dicarboxylic acid in a first step with reducing agents, tetrazotizing the 4:4'-diaminostilbene-3:3'-dicarboxylic acid in a second step with nitrous acid, coupling the tetrazotized 4:4'-diaminostilbene-3:3'-dicarboxylic acid in a third step with coupling components of the naphthalene series and treating the obtained disazo-dyestuff of the general formula

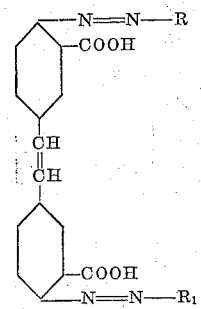

wherein R and R₁ represent naphthalene radicles, in a fourth step with agents yielding copper.

9. The metalliferous disazo-dyestuffs, which disazo-dyestuffs correspond with the general formula

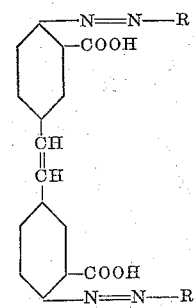

wherein R and R₁ represent the radicles of coupling components, which products form red-brown to dark colored powders, dissolving in water to brown to orange to red to red-violet to violet solutions and dyeing cotton orange to violet to blue to grey tints.

10. The metalliferous disazo-dyestuffs which contain metals of the atomic weight 52 to 66, which disazo-dyestuffs correspond with the general formula

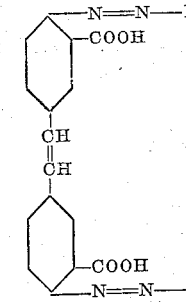

wherein R and R₁ represent the radicles of coupling components, which products form red-brown to dark colored powders, dissolving in water to brown to orange to red to red-violet to violet solutions and dyeing cotton orange to violet to blue to grey tints.

11. The cupriferous disazo-dyestuffs, which disazo-dyestuffs correspond with the general formula

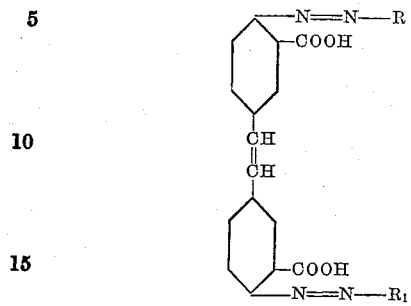

wherein R and R₁ represent the radicles of coupling components, which products form red-brown to dark colored powders, dissolving in water to brown to orange to red to red-violet to violet solutions and dyeing cotton orange to violet to blue to grey tints.

12. Cupriferous disazo-dyestuffs, which disazo-dyestuffs correspond with the general formula

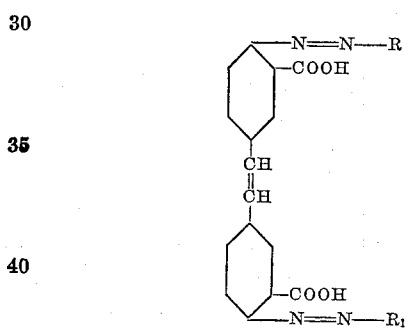

wherein R and R₁ represent aryl radicles, which products form red-brown to dark colored powders, dissolving in water to red to red-violet to violet solutions and dyeing cotton to violet to blue to grey tints.

13. Cupriferous disazo-dyestuffs, which disazo-dyestuffs correspond with the general formula

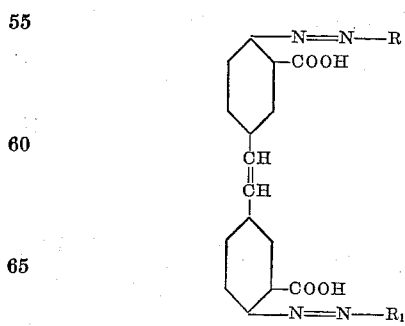

wherein R and R₁ represent naphthalene radicles, which products form red-brown to dark colored powders, dissolving in water to red to red-violet to violet solutions and dyeing cotton violet to blue to grey tints.

14. A cupriferous disazo-dyestuff, which disazo-dyestuff corresponds with the formula

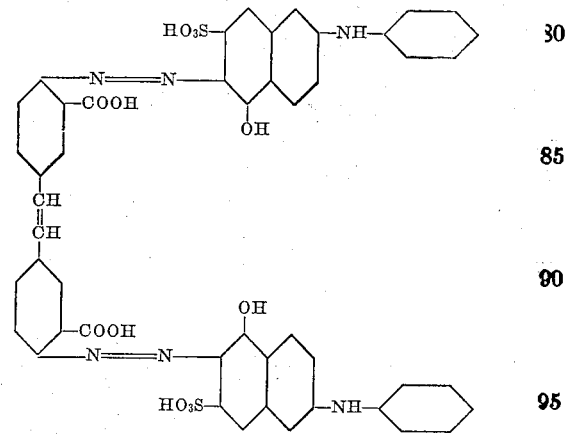

which product forms a dark powder, dissolving in water to a violet solution and dyeing cotton blue-violet tints.

15. Cupriferous disazo-dyestuffs, which disazo-dyestuffs correspond with the general formula

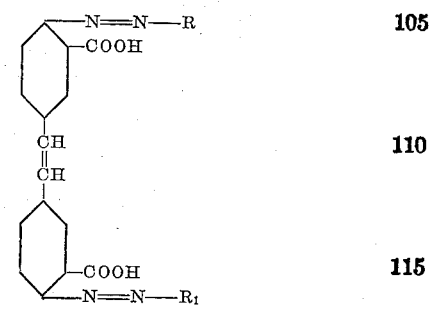

wherein R and R₁ represent the radicles of such coupling components whose carbon atoms linked with the —N═══N—bridges belong to heterocyclic rings, which products form red-brown to dark colored powders, dissolving in water to brown to orange to red solutions and dyeing cotton orange to brown tints.

16. Cupriferous disazo-dyestuffs, which disazo-dyestuffs correspond with the general formula

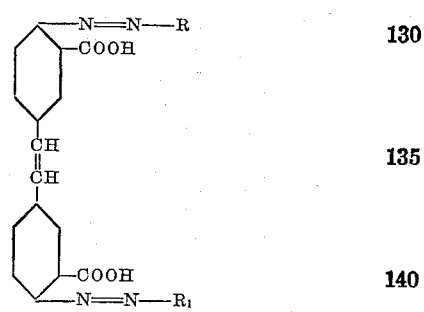

wherein R and R₁ represent the radicles of such coupling components whose carbon atoms linked with the —N═══N—bridges belong to pyrazolone rings, which products form red-brown to dark colored powders, dissolving in water to brown to orange to red solutions and dyeing cotton orange to brown tints.

17. A cupriferus disazo-dyestuff, which disazo-dyestuff corresponds with the formula

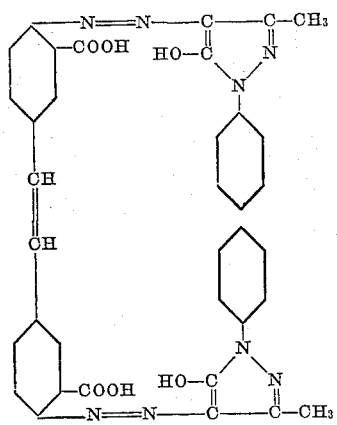

which product forms a red-brown powder, dissolving in water to an orange-brown solution and dyeing cotton red-orange tints.

18. Cupriferous disazo-dyestuffs, which disazo-dyestuffs correspond with the general formula

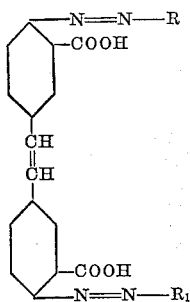

wherein R represents a naphthalene radicle and $R_1$ represents a radicle of such coupling component whose carbon atom linked with the —N═N—bridge belongs to an open chain, which products form dark colored powders, dissolving in water to red solutions and dyeing cotton grey tints.

19. A cupriferous disazo-dyestuff, which disazo-dyestuff corresponds with the formula

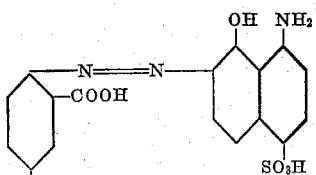

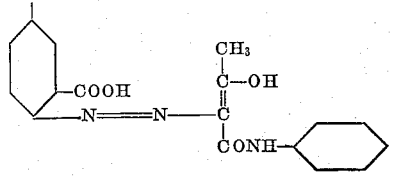

which product forms a dark colored powder, dissolving in water to a red solution and dyeing cotton brown-grey tints.

FRITZ STRAUB.
WALTER HANHART.